United States Patent
Natal et al.

(10) Patent No.: US 12,063,149 B2
(45) Date of Patent: *Aug. 13, 2024

(54) ON-PATH DYNAMIC POLICY ENFORCEMENT AND ENDPOINT-AWARE POLICY ENFORCEMENT FOR ENDPOINTS

(71) Applicant: Cisco Technology, Inc., San Jose, CA (US)

(72) Inventors: Alberto Rodriguez Natal, Mountain View, CA (US); Hendrikus G. P. Bosch, Aalsmeer (NL); Fabio Maino, Palo Alto, CA (US); Lars Olaf Stefan Olofsson, Dubai (AE); Jeffrey Napper, Delft (NL); Anubhav Gupta, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/353,702

(22) Filed: Jul. 17, 2023

(65) Prior Publication Data
US 2023/0362067 A1    Nov. 9, 2023

Related U.S. Application Data

(63) Continuation of application No. 17/538,983, filed on Nov. 30, 2021, now Pat. No. 11,743,141, which is a
(Continued)

(51) Int. Cl.
*H04L 41/5019* (2022.01)
*H04L 47/10* (2022.01)

(52) U.S. Cl.
CPC .......... *H04L 41/5019* (2013.01); *H04L 47/10* (2013.01)

(58) Field of Classification Search
CPC .......................... H04L 41/5019; H04L 47/10
See application file for complete search history.

(56) References Cited

U.S. PATENT DOCUMENTS

| 6,404,861 | B1 | 6/2002 | Cohen et al. |
| 8,612,612 | B1 | 12/2013 | Dukes et al. |

(Continued)

FOREIGN PATENT DOCUMENTS

| EP | 2884717 A1 | 6/2015 |
| EP | 2963866 A2 | 1/2016 |

(Continued)

OTHER PUBLICATIONS

Birkholz H., et al., "Improving Root Cause Failure Analysis in Virtual Networks via the Interconnected-Asset Ontology," IPTComm, 2014, pp. 1-8.

(Continued)

*Primary Examiner* — Frantz B Jean
(74) *Attorney, Agent, or Firm* — Polsinelli P.C.

(57) ABSTRACT

Systems, methods, and computer-readable media for locally applying endpoint-specific policies to an endpoint in a network environment. A network device local to one or more endpoints in a network environment can receive from a centralized network controller one or more network-wide endpoint policies. A first endpoint of the one or more endpoints can be configured to inject policy metadata into first data traffic. Policy metadata injected into the first traffic data can be received from the first endpoint. The network device can determine one or more first endpoint-specific polices for the first endpoint by evaluation the first policy metadata with respect to the one or more network-wide endpoint policies. As follows, the one or more first endpoint-specific policies can be applied to control data traffic associated with the first endpoint.

20 Claims, 10 Drawing Sheets

Related U.S. Application Data continuation of application No. 16/782,769, filed on Feb. 5, 2020, now Pat. No. 11,201,800.

(60) Provisional application No. 62/829,020, filed on Apr. 3, 2019.

(56) References Cited

U.S. PATENT DOCUMENTS

| | | |
|---|---|---|
| 8,693,374 B1 | 4/2014 | Murphy et al. |
| 8,856,909 B1 | 10/2014 | Chickering |
| 9,450,817 B1 | 9/2016 | Bahadur et al. |
| 9,547,726 B2 | 1/2017 | Ran et al. |
| 9,660,909 B2 | 5/2017 | Guichard et al. |
| 10,095,878 B2 | 10/2018 | Goldfarb et al. |
| 10,367,744 B1 | 7/2019 | Li et al. |
| 11,005,860 B1 | 5/2021 | Glyer et al. |
| 11,063,814 B2 | 7/2021 | Ramachandran et al. |
| 2003/0233420 A1 | 12/2003 | Stark et al. |
| 2006/0072457 A1 | 4/2006 | Noble |
| 2007/0143827 A1 | 6/2007 | Nicodemus et al. |
| 2008/0178278 A1 | 7/2008 | Grinstein et al. |
| 2010/0058433 A1 | 3/2010 | Szabo |
| 2010/0281179 A1 | 11/2010 | Istavan et al. |
| 2011/0107379 A1 | 5/2011 | Lajoie et al. |
| 2012/0023157 A1 | 1/2012 | Roth et al. |
| 2012/0216239 A1 | 8/2012 | Yadav et al. |
| 2013/0086626 A1 | 4/2013 | Kavantzas et al. |
| 2013/0097318 A1 | 4/2013 | Gladstone et al. |
| 2013/0205002 A1 | 8/2013 | Wang et al. |
| 2013/0238785 A1 | 9/2013 | Hawk et al. |
| 2013/0275552 A1 | 10/2013 | Dhesikan et al. |
| 2013/0304604 A1 | 11/2013 | Hoffman et al. |
| 2014/0192645 A1 | 7/2014 | Zhang et al. |
| 2015/0066572 A1 | 3/2015 | McLaren et al. |
| 2015/0124809 A1 | 5/2015 | Edsall et al. |
| 2015/0163158 A1 | 6/2015 | Ryland |
| 2015/0188949 A1 | 7/2015 | Mahaffey et al. |
| 2015/0207683 A1* | 7/2015 | Adogla ............... H04L 41/0893 |
| | | 709/223 |
| 2015/0326589 A1 | 11/2015 | Smith |
| 2015/0341285 A1 | 11/2015 | Aysola et al. |
| 2015/0381660 A1 | 12/2015 | Hsiung et al. |
| 2016/0080230 A1* | 3/2016 | Anand ................. H04L 47/125 |
| | | 709/224 |
| 2016/0219588 A1 | 7/2016 | Buddhikot et al. |
| 2016/0246676 A1 | 8/2016 | Bakre et al. |
| 2016/0323323 A1 | 11/2016 | Yanovsky et al. |
| 2016/0328222 A1* | 11/2016 | Arumugam ............... G06F 8/61 |
| 2016/0352629 A1 | 12/2016 | Wang et al. |
| 2016/0359915 A1 | 12/2016 | Gupta et al. |
| 2017/0005923 A1* | 1/2017 | Babakian ............ G06F 9/45558 |
| 2017/0012870 A1 | 1/2017 | Blair et al. |
| 2017/0099182 A1 | 4/2017 | DeBolle et al. |
| 2017/0155590 A1 | 6/2017 | Dillon et al. |
| 2017/0180406 A1 | 6/2017 | Zakian et al. |
| 2017/0195217 A1 | 7/2017 | Parasmal et al. |
| 2017/0195237 A1 | 7/2017 | Parasmal et al. |
| 2018/0007009 A1 | 1/2018 | Garcia Azorero et al. |
| 2018/0046753 A1 | 2/2018 | Shelton |
| 2018/0091410 A1 | 3/2018 | Browne et al. |
| 2018/0145899 A1 | 5/2018 | Rao |
| 2018/0205746 A1* | 7/2018 | Boutnaru ............... H04L 43/062 |
| 2018/0227221 A1 | 8/2018 | Starsinic et al. |
| 2018/0278479 A1 | 9/2018 | Vu et al. |
| 2018/0295036 A1 | 10/2018 | Krishnamurthy et al. |
| 2019/0036780 A1 | 1/2019 | Evans et al. |
| 2019/0058714 A1 | 2/2019 | Joshi et al. |
| 2019/0268381 A1 | 8/2019 | Narayanaswamy et al. |
| 2019/0268383 A1 | 8/2019 | Maino et al. |
| 2021/0073375 A1 | 3/2021 | Milburn et al. |
| 2021/0084109 A1 | 3/2021 | Gimenez Palop et al. |

FOREIGN PATENT DOCUMENTS

| | | |
|---|---|---|
| EP | 2974355 A2 | 1/2016 |
| EP | 3116171 A1 | 1/2017 |
| EP | 3116171 B1 | 8/2018 |
| EP | 3414932 A1 | 12/2018 |
| EP | 2974355 B1 | 2/2019 |
| WO | 2008083384 A2 | 7/2008 |
| WO | 2016044413 A1 | 3/2016 |
| WO | 2019035406 A1 | 2/2019 |

OTHER PUBLICATIONS

Bosshart P., et al., "P4: Programming Protocol-Independent Packet Processors," ACM Special Interest Group on Data Communication (SIGCOMM) Computer Communication Review, Jul. 2014, vol. 44, No. 3, pp. 87-95.

Brian M., et al., "Network Service Infrastructure System and Method," IP.com, JP2008537829A, Published on Sep. 25, 2008, 21 pages.

Cohen R., et al., "An Intent-based Approach for Network Virtualization," IFIP/IEEE International Symposium on Integrated Network Management (IM2013), 2013, pp. 42-50.

Dictionary, "Metadata," 2021, 1 Page.

Gaurav S., et al., "System and Method for Policy-based Multipath WAN Transports for Improved Quality of Service Over Broadband Networks," CA003014178A1, Published on Aug. 17, 2017, 2 Pages.

International Preliminary Report on Patentability for International Application No. PCT/US2020/026023, mailed Oct. 14, 2021, 11 Pages.

International Search Report and Written Opinion for International Application No. PCT/US2020/026023, mailed Jun. 18, 2020, 13 Pages.

Lopez-Vega J.M., et al., "A Content-aware Bridging Service for Publish/Subscribe Environments," The Journal of Systems and Software, Jan. 2013, vol. 86, No. 1, pp. 108-124.

Network Design, "WAN Transport Technologies," Cisco Certified Expert, Sep. 6, 2021, pp. 1-10.

RTI, "Introduction to Secure WAN Transport," 2021, 2 pages.

Smith N.M., et al., "The Internet of Things," IP.Com ,TW201835784A, Published on Oct. 1, 2018, pp. 1-319.

Vijaay D., et al., "Distributed Edge Processing of Internet of things Data in Colocation Facilities," IP.Com, JP2018533285A, Published on Nov. 8, 2018, pp. 1-22.

Yang J., et al., "End-To-End Policy-Agnostic Security for Database-Backed Applications," ResearchGate, Jul. 13, 2015, 16 pages.

* cited by examiner

ON-PATH DYNAMIC POLICY ENFORCEMENT AND ENDPOINT-AWARE POLICY ENFORCEMENT FOR ENDPOINTS

CROSS-REFERENCE TO RELATED APPLICATIONS

This application is a continuation of U.S. Non-Provisional patent application Ser. No. 17/538,983, entitled ON-PATH DYNAMIC POLICY ENFORCEMENT AND ENDPOINT-AWARE POLICY ENFORCEMENT FOR ENDPOINTS filed on Nov. 30, 2021, which is a continuation of U.S. patent Ser. No. 11/201,800 entitled ON-PATH DYNAMIC POLICY ENFORCEMENT AND ENDPOINT-AWARE POLICY ENFORCEMENT FOR ENDPOINTS filed on Feb. 5, 2020, which claims the benefit of U.S. Provisional Patent Application No. 62/829,020, filed on Apr. 3, 2019, the contents of which are incorporated herein by reference in their entireties.

TECHNICAL FIELD

The subject matter of this disclosure relates in general to the field of local policy enforcement, and more particularly, to on-path and endpoint-aware policy enforcement based on metadata of the endpoint.

BACKGROUND

The policy enforcement landscape is continuously evolving. There is a greater demand for mobile and Internet of Things (IoT) device traffic, Software as a Service (SaaS) applications, and cloud adoption. In addition, policy enforcement needs are increasing and certain applications can make more proper policy decisions.

Centralized policy enforcement models may not be suitable for all use-cases for a number of reasons. First, the centralized policy enforcement models use general policy information for different endpoints with different needs, and centralized policy enforcement models cannot keep track of all relevant local information that is essential for real-time policy decision making, thus the centralized policy enforcement models may experience scalability challenges. Second, because of the uniform approach of the centralized policy enforcement models, their efficiencies are low and this will affect the performance of each endpoint it is serving.

BRIEF DESCRIPTION OF THE FIGURES

To provide a more complete understanding of the present disclosure and features and advantages thereof, reference is made to the following description, taken in conjunction with the accompanying drawings, in which.

DESCRIPTION OF EXAMPLE EMBODIMENTS

Figure 1:
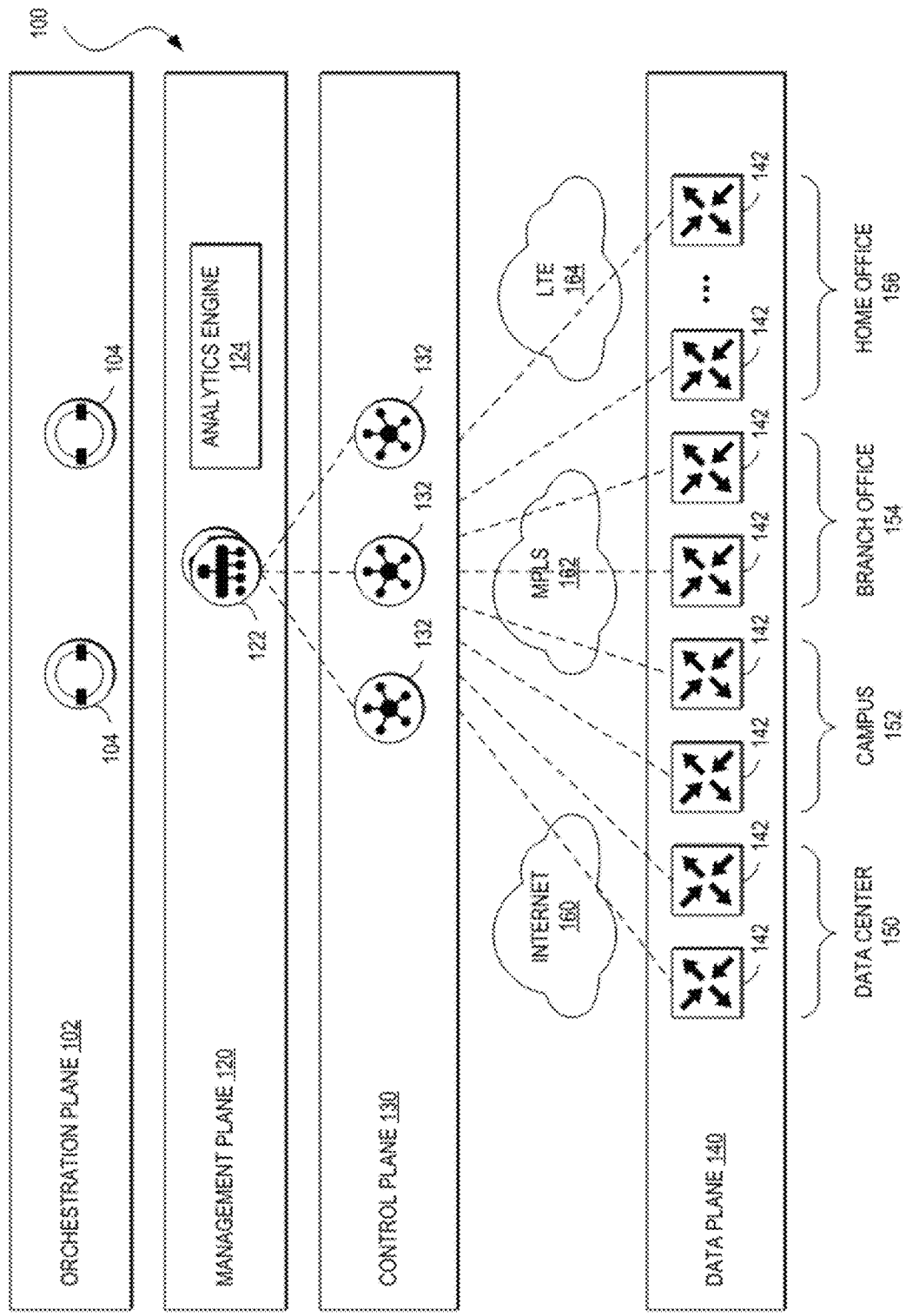
FIG. 1 illustrates an example of a high-level network architecture in accordance with an embodiment.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

A method can include receiving, by a network device local to one or more endpoints in a network environment from a centralized network controller, one or more network-wide endpoint policies; configuring a first endpoint of the one or more endpoints to inject a first policy metadata into first data traffic; receiving, by the network device from the first endpoint, the first policy metadata injected into the first data traffic; determining, by the network device, one or more first endpoint-specific policies for the first endpoint by evaluating the first policy metadata with respect to the one or more network-wide endpoint policies; and applying, by the network device, the one or more first endpoint-specific policies to control data traffic associated with the first endpoint.

In various embodiments, the data traffic associated with the first endpoint might include the first data traffic received at the network device from the first endpoint, and the method might further include applying, by the network device, the one or more first endpoint-specific policies to the first data traffic received from the first endpoint.

In various embodiments, the data traffic associated with the first endpoint might include data traffic transmitted to the first endpoint.

In various embodiments, the network device might be on-path in one or more traffic flows to or from the first endpoint and the network device might receive the first policy metadata with the first data traffic through at least one of the one or more traffic flows.

In various embodiments, the one or more first endpoint-specific policies might be derived from the one or more network-wide endpoint policies based on the first policy metadata.

In various embodiments, the first policy metadata might include data describing local operation of the first endpoint in the network environment with respect to the first data traffic.

In various embodiments, the first policy metadata might include policy-agnostic metadata for the first endpoint.

In various embodiments, the first policy metadata might include policy-specific metadata for the first endpoint, and the policy-specific metadata might be generated to apply one or more explicit policies for the first endpoint.

In various embodiments, the method might further include identifying, by the network device, past policy metadata injected into past data traffic and received from the first endpoint; and determining, by the network device, the one or more first endpoint-specific policies for the first endpoint by evaluating the first policy metadata and the past policy metadata with respect to the one or more network-wide endpoint policies.

In various embodiments, the method might further include removing, at the network device, the first policy metadata from the first data traffic; and preventing dissemination of the first policy metadata outside of the network device and into the network environment.

In various embodiments, the one or more network-wide endpoint policies might be selected and provided from a centralized network controller to the network device based on the first endpoint.

In various embodiments, the one or more network-wide endpoint policies might include network-wide endpoint policies and the network-wide endpoint policies might be aggregated at the network device as a subset of the retrieved network-wide endpoint policies received at the network device.

In various embodiments, the retrieved network-wide endpoint policies might be received from policy sources and the network-wide endpoint policies might be aggregated at the network device as the subset of the retrieved network-wide endpoint policies based on the first endpoint.

In various embodiments, the method might further include receiving, at the network device, sequential policy updates to the one or more network-wide endpoint policies; aggregating, by the network device, the sequential policy updates to generate aggregated policy updates for the one or more network-wide endpoint policies; modifying, by the network device, the one or more first endpoint-specific policies based on aggregated policy updates to generate one or more updated first endpoint-specific policies; and applying, by the network device, the one or more updated first endpoint-specific policies to further control the data traffic associated with the first endpoint based on the sequential policy updates to the one or more network-wide endpoint policies.

A system can include one or more processors and at least one computer-readable storage medium storing instructions which, when executed by the one or more processors, cause the one or more processors to perform operations including receiving, by a network device local to one or more endpoints in a network environment from a centralized network controller, one or more network-wide endpoint policies; configuring a first endpoint of the one or more endpoints to inject a first policy metadata into first data traffic; receiving, by the network device from the first endpoint, the first policy metadata injected into the first data traffic; determining, by the network device, one or more first endpoint-specific policies for the first endpoint by evaluating the first policy metadata with respect to the one or more network-wide endpoint policies; and applying, by the network device, the one or more first endpoint-specific policies to control data traffic associated with the first endpoint, wherein the data traffic includes the first data traffic received at the network device from the first endpoint.

In various embodiments, the data traffic associated with the first endpoint might include data traffic transmitted to the first endpoint.

In various embodiments, the first policy metadata might include either or both policy-agnostic metadata for the first endpoint and policy-specific metadata for the first endpoint.

A non-transitory computer-readable storage medium having stored therein instructions which, when executed by a processor, cause the processor to perform operations including receiving, by a network device local to one or more endpoints in a network environment from a centralized network controller, one or more network-wide endpoint policies; configuring a first endpoint of the one or more endpoints to inject a first policy metadata into first data traffic; receiving, by the network device from the first endpoint, the first policy metadata injected into the first data traffic; determining, by the network device, one or more first endpoint-specific policies for the first endpoint by evaluating the first policy metadata with respect to the one or more network-wide endpoint policies; and applying, by the network device, the one or more first endpoint-specific policies to control data traffic associated with the first endpoint, wherein the data traffic includes the first data traffic received at the network device from the first endpoint.

Example Embodiments

The disclosed technology addresses the need in the art for local policy enforcement in a network environment. In particular, the disclosed technology addresses the need in the art for scalable and efficient policy enforcement locally for endpoints in a network environment. The present technology involves system, methods, and computer-readable media for locally applying endpoint-specific policies to an endpoint in a network environment. In particular, the present technology involves systems, methods, and computer-readable media for locally applying endpoint-specific policies to an endpoint in a network environment from network-wide endpoint policies based on metadata of the endpoint.

FIG. 1 illustrates an example of a network architecture 100 for implementing aspects of the present technology. An example of an implementation of the network architecture 100 is the Cisco® SDWAN architecture. However, one of ordinary skill in the art will understand that, for the network architecture 100 and any other system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

In this example, the network architecture 100 can comprise an orchestration plane 102, a management plane 120, a control plane 130, and a data plane 140. The orchestration plane can 102 assist in the automatic on-boarding of edge network devices 142 (e.g., switches, routers, etc.) in an overlay network. The orchestration plane 102 can include one or more physical or virtual network orchestrator appliances 104. The network orchestrator appliance(s) 104 can perform the initial authentication of the edge network devices 142 and orchestrate connectivity between devices of the control plane 130 and the data plane 140. In some embodiments, the network orchestrator appliance(s) 104 can also enable communication of devices located behind Network Address Translation (NAT). In some embodiments, physical or virtual Cisco® SD-WAN vBond appliances can operate as the network orchestrator appliance(s) 104.

The management plane 120 can be responsible for central configuration and monitoring of a network. The management plane 120 can include one or more physical or virtual network management appliances 122. In some embodiments, the network management appliance(s) 122 can provide centralized management of the network via a graphical user interface to enable a user to monitor, configure, and maintain the edge network devices 142 and links (e.g., Internet transport network 160, MPLS network 162, 4G/LTE network 164) in an underlay and overlay network. The network management appliance(s) 122 can support multi-tenancy and enable centralized management of logically isolated networks associated with different entities (e.g., enterprises, divisions within enterprises, groups within divisions, etc.). Alternatively or in addition, the network management appliance(s) 122 can be a dedicated network management system for a single entity. In some embodiments, physical or virtual Cisco® SD-WAN vManage appliances can operate as the network management appliance(s) 122.

The control plane 130 can build and maintain a network topology and make decisions on where traffic flows. The control plane 130 can include one or more physical or virtual network controller appliance(s) 132. The network controller appliance(s) 132 can establish secure connections to each network device 142 and distribute route and policy information via a control plane protocol (e.g., Overlay Management Protocol (OMP) (discussed in further detail below), Open Shortest Path First (OSPF), Intermediate System to Intermediate System (IS-IS), Border Gateway Protocol (BGP), Protocol-Independent Multicast (PIM), Internet Group Management Protocol (IGMP), Internet Control Message Protocol (ICMP), Address Resolution Protocol (ARP), Bidirectional Forwarding Detection (BFD), Link Aggregation Control Protocol (LACP), etc.). In some embodiments, the network controller appliance(s) 132 can operate as route reflectors. The network controller appliance(s) 132 can also orchestrate secure connectivity in the data plane 140 between and among the edge network devices 142. For example, in some embodiments, the network controller appliance(s) 132 can distribute crypto key information among the network device(s) 142. This can allow the network to support a secure network protocol or application (e.g., Internet Protocol Security (IPSec), Transport Layer Security (TLS), Secure Shell (SSH), etc.) without Internet Key Exchange (IKE) and enable scalability of the network. In some embodiments, physical or virtual Cisco® SD-WAN vSmart controllers can operate as the network controller appliance(s) 132.

The data plane 140 can be responsible for forwarding packets based on decisions from the control plane 130. The data plane 140 can include the edge network devices 142, which can be physical or virtual network devices. The edge network devices 142 can operate at the edges various network environments of an organization, such as in one or more data centers or colocation centers 150, campus networks 152, branch office networks 154, home office networks 154, and so forth, or in the cloud (e.g., Infrastructure as a Service (IaaS), Platform as a Service (PaaS), SaaS, and other cloud service provider networks). The edge network devices 142 can provide secure data plane connectivity among sites over one or more WAN transports, such as via one or more Internet transport networks 160 (e.g., Digital Subscriber Line (DSL), cable, etc.), MPLS networks 162 (or other private packet-switched network (e.g., Metro Ethernet, Frame Relay, Asynchronous Transfer Mode (ATM), etc.), mobile networks 164 (e.g., 3G, 4G/LTE, 5G, etc.), or other WAN technology (e.g., Synchronous Optical Networking (SONET), Synchronous Digital Hierarchy (SDH), Dense Wavelength Division Multiplexing (DWDM), or other fiber-optic technology; leased lines (e.g., T1/E1, T3/E3, etc.); Public Switched Telephone Network (PSTN), Integrated Services Digital Network (ISDN), or other private circuit-switched network; small aperture terminal (VSAT) or other satellite network; etc.). The edge network devices 142 can be responsible for traffic forwarding, security, encryption, quality of service (QoS), and routing (e.g., BGP, OSPF, etc.), among other tasks. In some embodiments, physical or virtual Cisco® SD-WAN vEdge routers can operate as the edge network devices 142.

Figure 2:
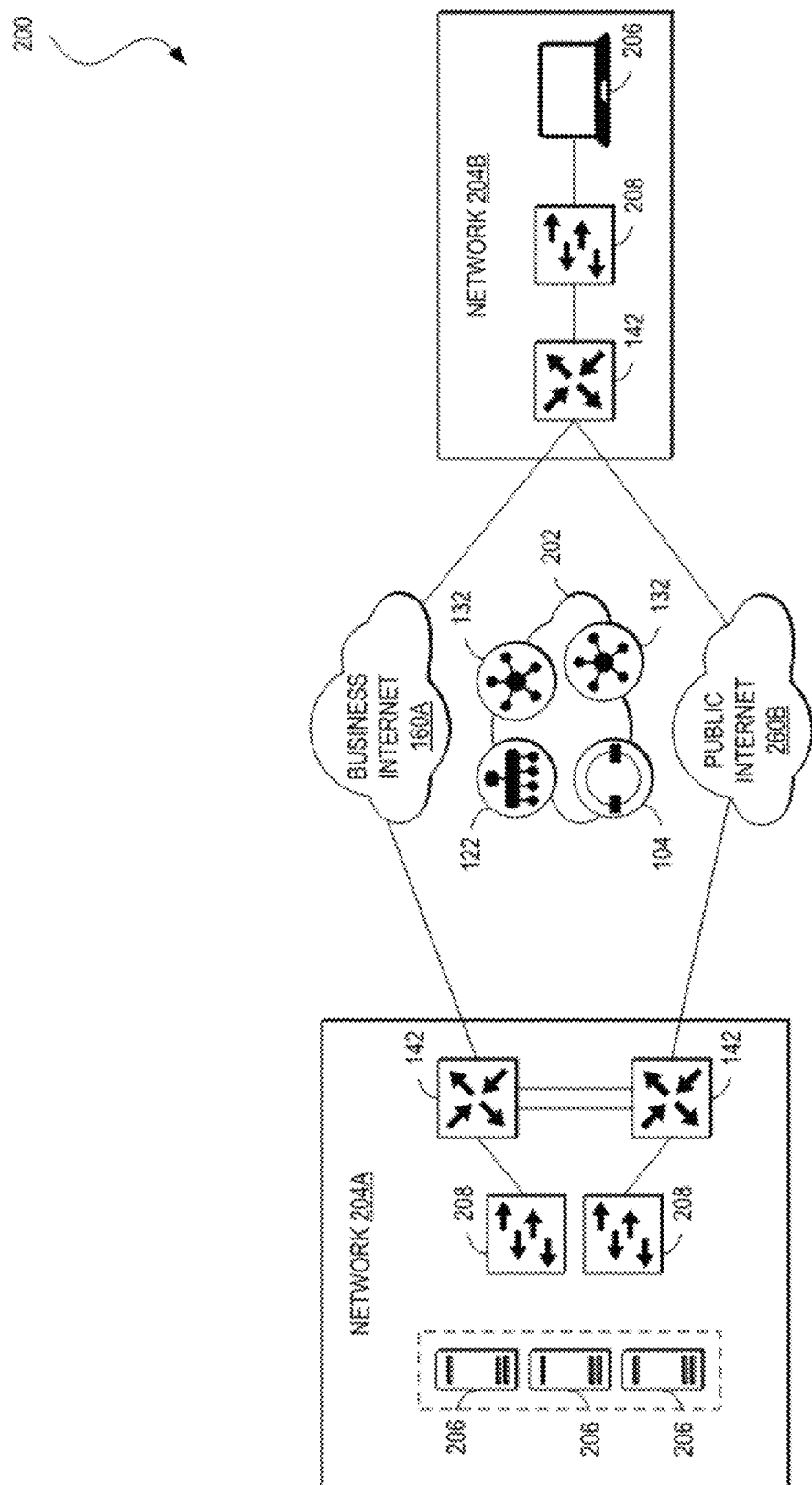
FIG. 2 illustrates an example of a network topology in accordance with an embodiment.

FIG. 2 illustrates an example of a network topology 200 for showing various aspects of the network architecture 100. The network topology 200 can include a management network 202, a pair of network sites 204A and 204B (collectively, 204) (e.g., the data center(s) 150, the campus network(s) 152, the branch office network(s) 154, the home office network(s) 156, cloud service provider network(s), etc.), and a pair of Internet transport networks 160A and 160B (collectively, 160). The management network 202 can include one or more network orchestrator appliances 104, one or more network management appliance 122, and one or more network controller appliances 132. Although the management network 202 is shown as a single network in this example, one of ordinary skill in the art will understand that each element of the management network 202 can be distributed across any number of networks and/or be co-located with the sites 204. In this example, each element of the management network 202 can be reached through either transport network 160A or 160B.

Each site can include one or more endpoints 206 connected to one or more site network devices 208. The endpoints 206 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. The endpoints 206 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

The site network devices 208 can include physical or virtual switches, routers, and other network devices. Although the site 204A is shown including a pair of site network devices and the site 204B is shown including a single site network device in this example, the site network devices 208 can comprise any number of network devices in any network topology, including multi-tier (e.g., core, distribution, and access tiers), spine-and-leaf, mesh, tree, bus, hub and spoke, and so forth. For example, in some embodiments, one or more data center networks may implement the Cisco® Application Centric Infrastructure (ACI) architecture and/or one or more campus networks may implement the Cisco® Software Defined Access (SD-Access or SDA) architecture. The site network devices 208 can connect the endpoints 206 to one or more edge network devices 142, and the edge network devices 142 can be used to directly connect to the transport networks 160.

In some embodiments, "color" can be used to identify an individual WAN transport network, and different WAN transport networks may be assigned different colors (e.g., mpls, private1, biz-internet, metro-ethernet, lte, etc.). In this example, the network topology 200 can utilize a color called "biz-internet" for the Internet transport network 160A and a color called "public-internet" for the Internet transport network 160B.

In some embodiments, each edge network device 208 can form a Datagram Transport Layer Security (DTLS) or TLS control connection to the network controller appliance(s) 132 and connect to any network control appliance 132 over each transport network 160. In some embodiments, the edge network devices 142 can also securely connect to edge network devices in other sites via IPSec tunnels. In some embodiments, the BFD protocol may be used within each of these tunnels to detect loss, latency, jitter, and path failures.

On the edge network devices 142, color can be used help to identify or distinguish an individual WAN transport tunnel (e.g., no same color may be used twice on a single edge network device). Colors by themselves can also have significance. For example, the colors metro-ethernet, mpls, and private1, private2, private3, private4, private5, and private6 may be considered private colors, which can be used for private networks or in places where there is no NAT addressing of the transport IP endpoints (e.g., because there may be no NAT between two endpoints of the same color). When the edge network devices 142 use a private color, they may attempt to build IPSec tunnels to other edge network devices using native, private, underlay IP addresses. The public colors can include 3 g, biz, internet, blue, bronze, custom1, custom2, custom3, default, gold, green, lte, public-internet, red, and silver. The public colors may be used by the edge network devices 142 to build tunnels to post-NAT IP addresses (if there is NAT involved). If the edge network devices 142 use private colors and need NAT to communicate to other private colors, the carrier setting in the configuration can dictate whether the edge network devices 142 use private or public IP addresses. Using this setting, two private colors can establish a session when one or both are using NAT.

Figure 3:
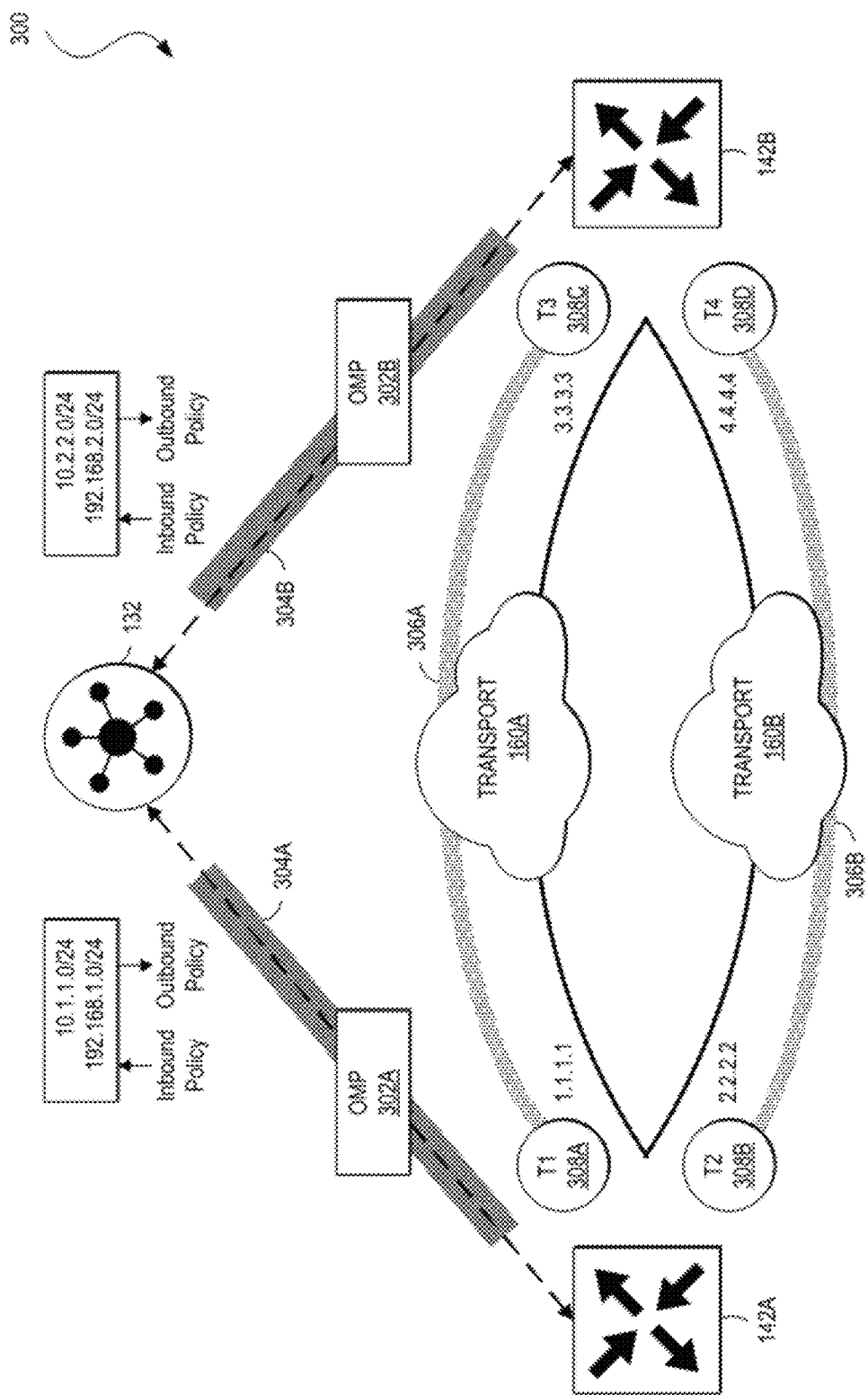
FIG. 3 illustrates an example of a diagram showing the operation of a protocol for managing an overlay network in accordance with an embodiment.

FIG. 3 illustrates an example of a diagram 300 showing the operation of OMP, which may be used in some embodiments to manage an overlay of a network (e.g., the network architecture 100). In this example, OMP messages 302A and 302B (collectively, 302) may be transmitted back and forth between the network controller appliance 132 and the edge network devices 142A and 142B, respectively, where control plane information, such as route prefixes, next-hop routes, crypto keys, policy information, and so forth, can be exchanged over respective secure DTLS or TLS connections 304A and 304B. The network controller appliance 132 can operate similarly to a route reflector. For example, the network controller appliance 132 can receive routes from the edge network devices 142, process and apply any policies to them, and advertise routes to other edge network devices 142 in the overlay. If there is no policy defined, the edge network devices 142 may behave in a manner similar to a full mesh topology, where each edge network device 142 can connect directly to another edge network device 142 at another site and receive full routing information from each site.

OMP can advertise three types of routes:

OMP routes, which can correspond to prefixes that are learned from the local site, or service side, of the edge network device 142. The prefixes can be originated as static or connected routes, or from within, for example, the OSPF or BGP protocols, and redistributed into OMP so they can be carried across the overlay. OMP routes can advertise attributes such as transport location (TLOC) information (which can similar to a BGP next-hop IP address) and other attributes such as origin, originator, preference, site identifier, tag, and virtual private network (VPN). An OMP route may be installed in the forwarding table if the TLOC to which it points is active.

TLOC routes, which can correspond to logical tunnel termination points on the edge network devices 142 that connect into the transport networks 160. In some embodiments, a TLOC route can be uniquely identified and represented by a three-tuple, including an IP address, link color, and encapsulation (e.g., Generic Routing Encapsulation (GRE), IPSec, etc.). In addition to system IP address, color, and encapsulation, TLOC routes can also carry attributes such as TLOC private and public IP addresses, carrier, preference, site identifier, tag, and weight. In some embodiments, a TLOC may be in an active state on a particular edge network device 142 when an active BFD session is associated with that TLOC.

Service routes, which can represent services (e.g., firewall, distributed denial of service (DDoS) mitigator, load balancer, intrusion prevent system (IPS), intrusion detection systems (IDS), WAN optimizer, etc.) that may be connected to the local sites of the edge network devices 142 and accessible to other sites for use with service insertion. In addition, these routes can also include VPNs; the VPN labels can be sent in an update type to tell the network controller appliance 132 what VPNs are serviced at a remote site.

In the example of FIG. 3, OMP is shown running over the DTLS/TLS tunnels 304 established between the edge network devices 142 and the network controller appliance 132. In addition, the diagram 300 shows an IPSec tunnel 306A established between TLOC 308A and 308C over the WAN transport network 160A and an IPSec tunnel 306B established between TLOC 308B and TLOC 308D over the WAN transport network 160B. Once the IPSec tunnels 306A and 306B are established, BFD can be enabled across each of them.

Figure 4:
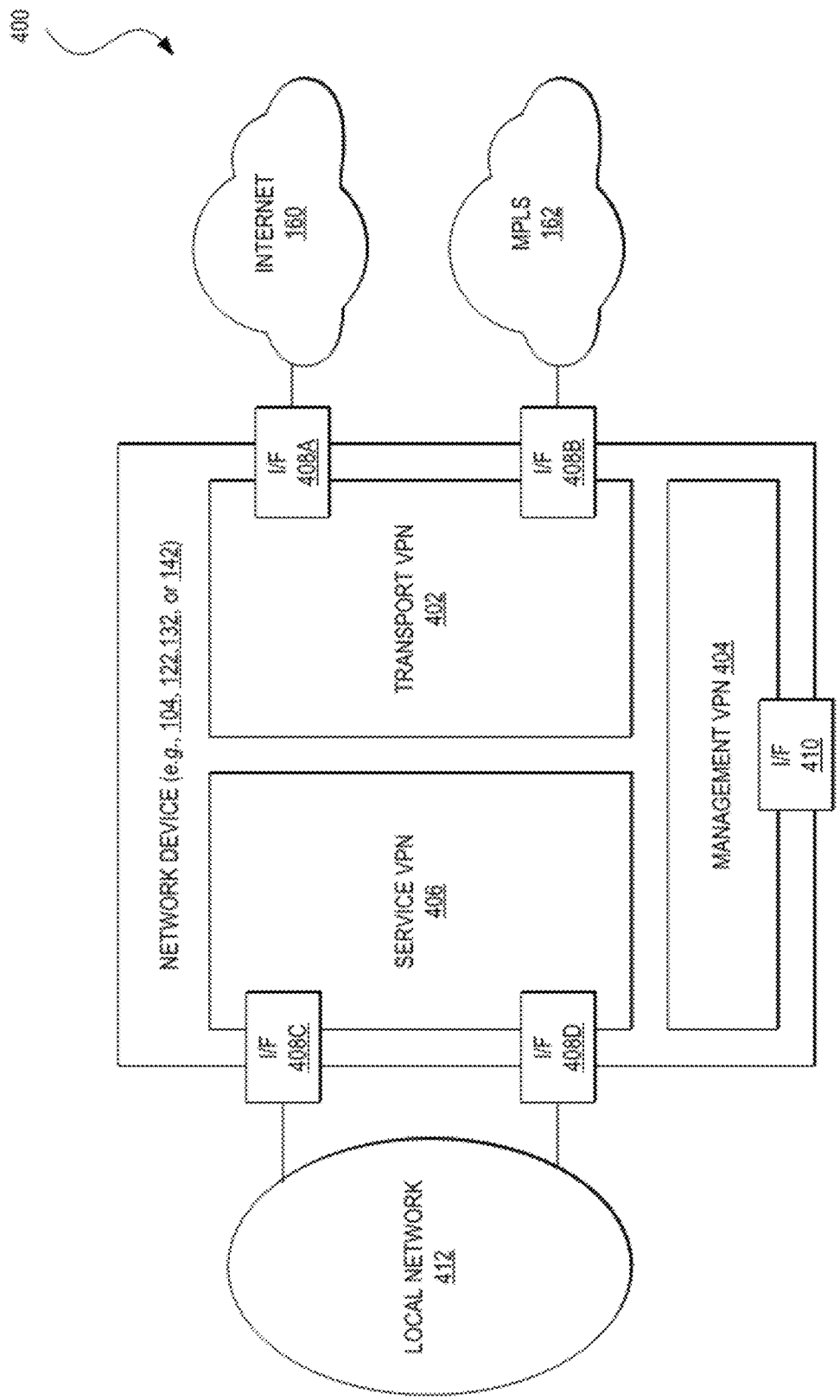
FIG. 4 illustrates an example of a diagram showing the operation of virtual private networks for segmenting a network in accordance with an embodiment.

FIG. 4 illustrates an example of a diagram 400 showing the operation of VPNs, which may be used in some embodiments to provide segmentation for a network (e.g., the network architecture 100). VPNs can be isolated from one another and can have their own forwarding tables. An interface or sub-interface can be explicitly configured under a single VPN and may not be part of more than one VPN. Labels may be used in OMP route attributes and in the packet encapsulation, which can identify the VPN to which a packet belongs. The VPN number can be a four-byte integer with a value from 0 to 65530. In some embodiments, the network orchestrator appliance(s) 104, network management appliance(s) 122, network controller appliance(s) 132, and/or edge network device(s) 142 can each include a transport VPN 402 (e.g., VPN number 0) and a management VPN 404 (e.g., VPN number 512). The transport VPN 402 can include one or more physical or virtual network interfaces (e.g., network interfaces 410A and 410B) that respectively connect to WAN transport networks (e.g., the MPLS network 162 and the Internet transport network 160). Secure DTLS/TLS connections to the network controller appliance(s) 132 or between the network controller appliance(s) 132 and the network orchestrator appliance(s) 104 can be initiated from the transport VPN 402. In addition, static or default routes or a dynamic routing protocol can be configured inside the transport VPN 402 to get appropriate next-hop information so that the control plane 130 may be established and IPSec tunnels 306 (not shown) can connect to remote sites.

The management VPN 404 can carry out-of-band management traffic to and from the network orchestrator appliance(s) 104, network management appliance(s) 122, network controller appliance(s) 132, and/or edge network device(s) 142 over a network interface 410C. In some embodiments, the management VPN 404 may not be carried across the overlay network.

In addition to the transport VPN 402 and the management VPN 404, the network orchestrator appliance(s) 104, network management appliance(s) 122, network controller appliance(s) 132, or edge network device(s) 142 can also include one or more service-side VPNs 406. The service-side VPN 406 can include one or more physical or virtual network interfaces (e.g., network interfaces 410D and 410E) that connect to one or more local-site networks 412 and carry user data traffic. The service-side VPN(s) 406 can be enabled for features such as OSPF or BGP, Virtual Router Redundancy Protocol (VRRP), QoS, traffic shaping, policing, and so forth. In some embodiments, user traffic can be directed over IPSec tunnels to other sites by redistributing OMP routes received from the network controller appliance(s) 132 at the site 412 into the service-side VPN routing protocol. In turn, routes from the local site 412 can be advertised to other sites by advertising the service VPN routes into the OMP routing protocol, which can be sent to the network controller appliance(s) 132 and redistributed to other edge network devices 142 in the network. Although the network interfaces 410A-E (collectively, 410) are shown to be physical interfaces in this example, one of ordinary skill in the art will appreciate that the interfaces 410 in the transport and service VPNs can also be sub-interfaces instead.

Figure 5A:
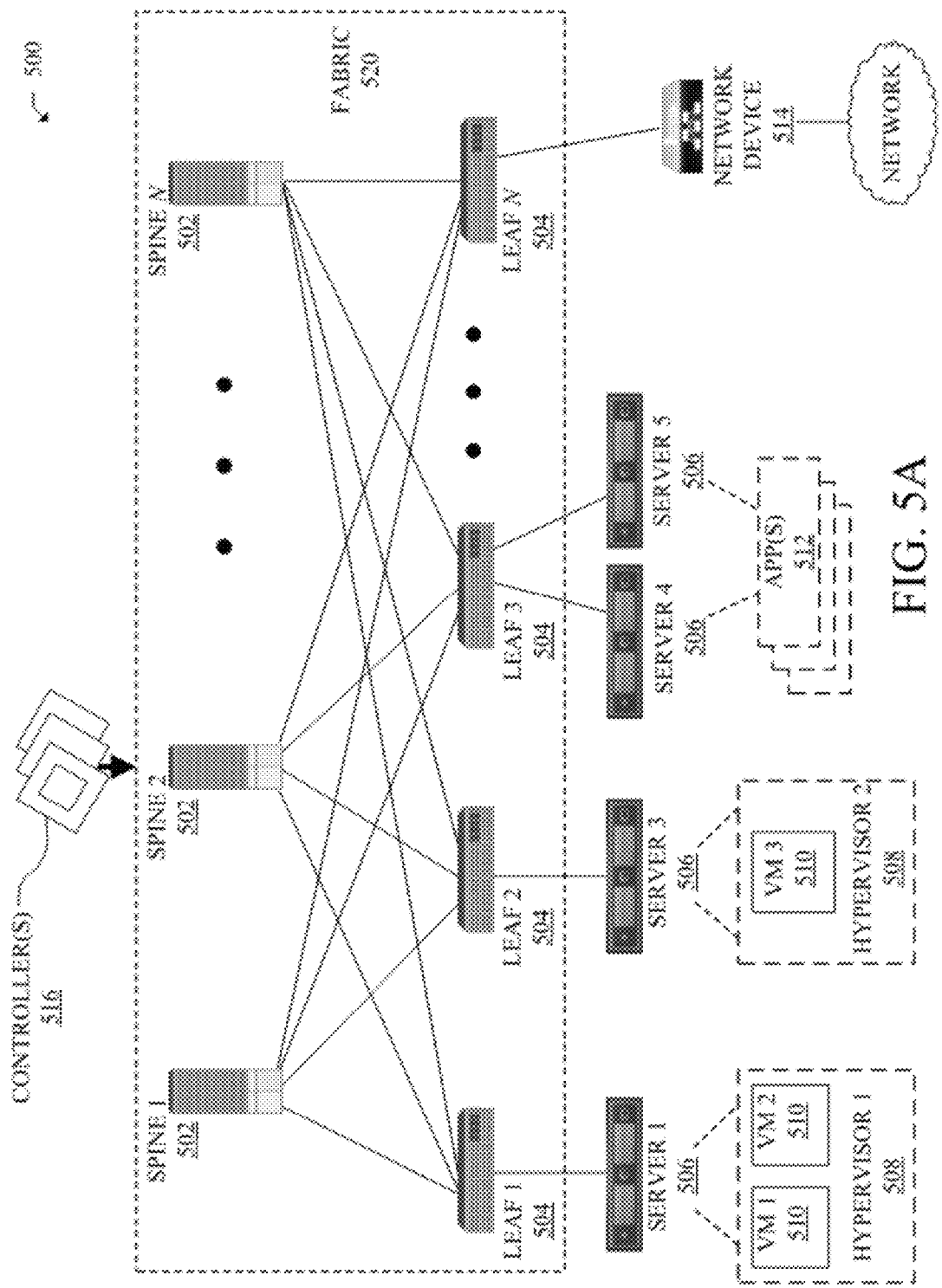
FIG. 5A illustrates a diagram of an example Network Environment, such as a data center.

FIG. 5A illustrates a diagram of an example Network Environment 500, such as a data center. In some cases, the Network Environment 500 can include a data center, which can support and/or host a cloud environment. The Network Environment 500 can include a Fabric 520 which can represent the physical layer or infrastructure (e.g., underlay) of the Network Environment 500. Fabric 520 can include Spines 502 (e.g., spine routers or switches) and Leafs 504 (e.g., leaf routers or switches) which can be interconnected for routing or switching traffic in the Fabric 520. Spines 502 can interconnect Leafs 504 in the Fabric 520, and Leafs 504 can connect the Fabric 520 to an overlay or logical portion of the Network Environment 500, which can include application services, servers, virtual machines, containers, endpoints, etc. Thus, network connectivity in the Fabric 520 can flow from Spines 502 to Leafs 504, and vice versa. The interconnections between Leafs 504 and Spines 502 can be redundant (e.g., multiple interconnections) to avoid a failure in routing. In some embodiments, Leafs 504 and Spines 502 can be fully connected, such that any given Leaf is connected to each of the Spines 502, and any given Spine is connected to each of the Leafs 504. Leafs 504 can be, for example, top-of-rack ("ToR") switches, aggregation switches, gateways, ingress and/or egress switches, provider edge devices, and/or any other type of routing or switching device.

Leafs 504 can be responsible for routing and/or bridging tenant or customer packets and applying network policies or rules. Network policies and rules can be driven by one or more Controllers 516, and/or implemented or enforced by one or more devices, such as Leafs 504. Leafs 504 can connect other elements to the Fabric 520. For example, Leafs 504 can connect Servers 506, Hypervisors 508, Virtual Machines (VMs) 510, Applications 512, Network Device 514, etc., with Fabric 520. Such elements can reside in one or more logical or virtual layers or networks, such as an overlay network. In some cases, Leafs 504 can encapsulate and decapsulate packets to and from such elements (e.g., Servers 506) in order to enable communications throughout Network Environment 500 and Fabric 520. Leafs 504 can also provide any other devices, services, tenants, or workloads with access to Fabric 520. In some cases, Servers 506 connected to Leafs 504 can similarly encapsulate and decapsulate packets to and from Leafs 504. For example, Servers 506 can include one or more virtual switches or routers or tunnel endpoints for tunneling packets between an overlay or logical layer hosted by, or connected to, Servers 506 and an underlay layer represented by Fabric 520 and accessed via Leafs 504.

Applications 512 can include software applications, services, containers, appliances, functions, service chains, etc. For example, Applications 512 can include a firewall, a database, a CDN server, an IDS/IPS, a deep packet inspection service, a message router, a virtual switch, etc. An application from Applications 512 can be distributed, chained, or hosted by multiple endpoints (e.g., Servers 506, VMs 510, etc.), or may run or execute entirely from a single endpoint.

VMs 510 can be virtual machines hosted by Hypervisors 508 or virtual machine managers running on Servers 506. VMs 510 can include workloads running on a guest operating system on a respective server. Hypervisors 508 can provide a layer of software, firmware, and/or hardware that creates, manages, and/or runs the VMs 510. Hypervisors 508 can allow VMs 510 to share hardware resources on Servers 506, and the hardware resources on Servers 506 to appear as multiple, separate hardware platforms. Moreover, Hypervisors 508 on Servers 506 can host one or more VMs 510.

In some cases, VMs 510 can be migrated to other Servers 506. Servers 506 can similarly be migrated to other physical locations in Network Environment 500. For example, a server connected to a specific leaf can be changed to connect to a different or additional leaf. Such configuration or deployment changes can involve modifications to settings, configurations and policies that are applied to the resources being migrated as well as other network components.

In some cases, one or more Servers 506, Hypervisors 508, and/or VMs 510 can represent or reside in a tenant or customer space. Tenant space can include workloads, services, applications, devices, networks, and/or resources that are associated with one or more clients or subscribers. Accordingly, traffic in Network Environment 500 can be routed based on specific tenant policies, spaces, agreements, configurations, etc. Moreover, addressing can vary between one or more tenants. In some configurations, tenant spaces can be divided into logical segments and/or networks and separated from logical segments and/or networks associated with other tenants. Addressing, policy, security and configuration information between tenants can be managed by Controllers 516, Servers 506, Leafs 504, etc.

Configurations in Network Environment 500 can be implemented at a logical level, a hardware level (e.g., physical), and/or both. For example, configurations can be implemented at a logical and/or hardware level based on endpoint or resource attributes, such as endpoint types and/or application groups or profiles, through a software-defined networking (SDN) framework (e.g., ACI or VMWARE NSX). To illustrate, one or more administrators can define configurations at a logical level (e.g., application or software level) through Controllers 516, which can implement or propagate such configurations through Network Environment 500. In some examples, Controllers 516 can be Application Policy Infrastructure Controllers (APICs) in an ACI framework. In other examples, Controllers 516 can be one or more management components for associated with other SDN solutions, such as NSX Managers.

Such configurations can define rules, policies, priorities, protocols, attributes, objects, etc., for routing and/or classifying traffic in Network Environment 500. For example, such configurations can define attributes and objects for classifying and processing traffic based on Endpoint Groups, Security Groups (SGs), VM types, bridge domains (BDs), virtual routing and forwarding instances (VRFs), tenants, priorities, firewall rules, etc. Other example network objects and configurations are further described below. Traffic policies and rules can be enforced based on tags, attributes, or other characteristics of the traffic, such as protocols associated with the traffic, EPGs associated with the traffic, SGs associated with the traffic, network address information associated with the traffic, etc. Such policies and rules can be enforced by one or more elements in Network Environment 500, such as Leafs 504, Servers 506, Hypervisors 508, Controllers 516, etc. As previously explained, Network Environment 500 can be configured according to one or more particular SDN solutions, such as CISCO ACI or VMWARE NSX. These example SDN solutions are briefly described below.

ACI can provide an application-centric or policy-based solution through scalable distributed enforcement. ACI supports integration of physical and virtual environments under a declarative configuration model for networks, servers, services, security, requirements, etc. For example, the ACI framework implements EPGs, which can include a collection of endpoints or applications that share common configuration requirements, such as security, QoS, services, etc. Endpoints can be virtual/logical or physical devices, such as VMs, containers, hosts, or physical servers that are connected to Network Environment 500. Endpoints can have one or more attributes such as a VM name, guest OS name, a security tag, application profile, etc. Application configurations can be applied between EPGs, instead of endpoints directly, in the form of contracts. Leafs 504 can classify incoming traffic into different EPGs. The classification can be based on, for example, a network segment identifier such as a VLAN ID, VXLAN Network Identifier (VNID), NVGRE Virtual Subnet Identifier (VSID), MAC address, IP address, etc.

In some cases, classification in the ACI infrastructure can be implemented by ACI virtual edge (AVE), which can run on a host, such as a server, e.g. a vSwitch running on a server. For example, the AVE can classify traffic based on specified attributes, and tag packets of different attribute EPGs with different identifiers, such as network segment identifiers (e.g., VLAN ID). Finally, Leafs 504 can tie packets with their attribute EPGs based on their identifiers and enforce policies, which can be implemented and/or managed by one or more Controllers 516. Leaf 504 can classify to which EPG the traffic from a host belongs and enforce policies accordingly.

Another example SDN solution is based on VMWARE NSX. With VMWARE NSX, hosts can run a distributed firewall (DFW) which can classify and process traffic. Consider a case where three types of VMs, namely, application, database and web VMs, are put into a single layer-2 network segment. Traffic protection can be provided within the network segment based on the VM type. For example, HTTP traffic can be allowed among web VMs, and disallowed between a web VM and an application or database VM. To classify traffic and implement policies, VMWARE NSX can implement security groups, which can be used to group the specific VMs (e.g., web VMs, application VMs, database VMs). DFW rules can be configured to implement policies for the specific security groups. To illustrate, in the context of the previous example, DFW rules can be configured to block HTTP traffic between web, application, and database security groups.

Returning now to FIG. 5A, Network Environment 500 can deploy different hosts via Leafs 504, Servers 506, Hypervisors 508, VMs 510, Applications 512, and Controllers 516, such as VMWARE ESXi hosts, WINDOWS HYPER-V hosts, bare metal physical hosts, etc. Network Environment 500 may interoperate with a variety of Hypervisors 508, Servers 506 (e.g., physical and/or virtual servers), SDN orchestration platforms, etc. Network Environment 200 may implement a declarative model to allow its integration with application design and holistic network policy.

Controllers 516 can provide centralized access to fabric information, application configuration, resource configuration, application-level configuration modeling for a SDN infrastructure, integration with management systems or servers, etc. Controllers 516 can form a control plane that interfaces with an application plane via northbound APIs and a data plane via southbound APIs.

As previously noted, Controllers 516 can define and manage application-level model(s) for configurations in Network Environment 500. In some cases, application or device configurations can also be managed and/or defined by other components in the network. For example, a hypervisor or virtual appliance, such as a VM or container, can run a server or management tool to manage software and services in Network Environment 500, including configurations and settings for virtual appliances.

As illustrated above, Network Environment 500 can include one or more different types of SDN solutions, hosts, etc. For the sake of clarity and explanation purposes, various examples in the disclosure will be described with reference to an ACI framework, and Controllers 516 may be interchangeably referenced as controllers, APICs, or APIC controllers. However, it should be noted that the technologies and concepts herein are not limited to ACI solutions and may be implemented in other architectures and scenarios, including other SDN solutions as well as other types of networks which may not deploy an SDN solution.

Further, as referenced herein, the term "hosts" can refer to Servers 506 (e.g., physical or logical), Hypervisors 508, VMs 510, containers (e.g., Applications 512), etc., and can run or include any type of server or application solution. Non-limiting examples of "hosts" can include virtual switches or routers, such as distributed virtual switches (DVS), AVE nodes, vector packet processing (VPP) switches; VCENTER and NSX MANAGERS; bare metal physical hosts; HYPER-V hosts; VMs; DOCKER Containers; etc.

Figure 5B:
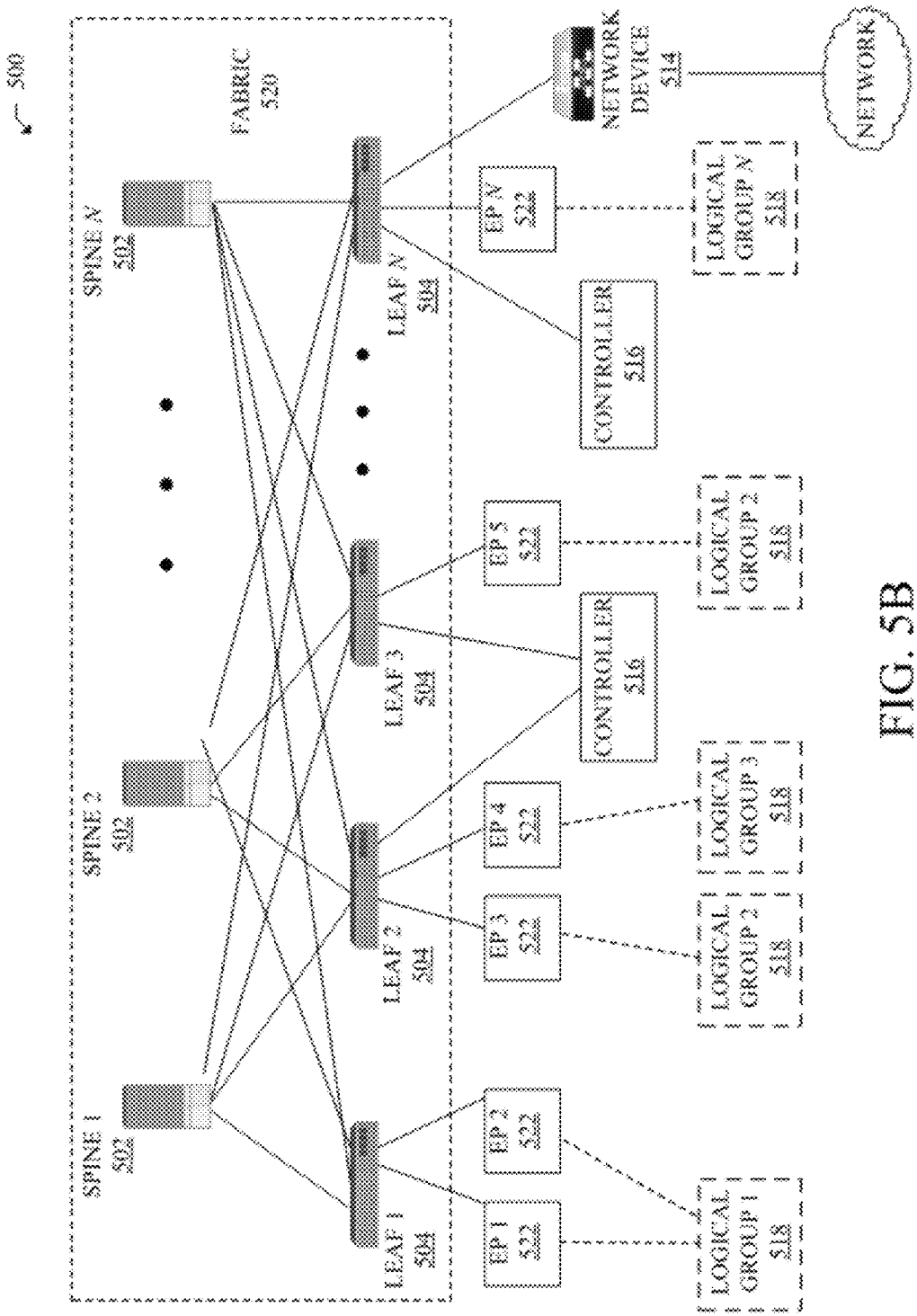
FIG. 5B illustrates another example Network Environment.

FIG. 5B illustrates another example of Network Environment 500. In this example, Network Environment 500 includes Endpoints 522 connected to Leafs 504 in Fabric 520. Endpoints 522 can be physical and/or logical or virtual entities, such as servers, clients, VMs, hypervisors, software containers, applications, resources, network devices, workloads, etc. For example, an Endpoint 522 can be an object that represents a physical device (e.g., server, client, switch, etc.), an application (e.g., web application, database application, etc.), a logical or virtual resource (e.g., a virtual switch, a virtual service appliance, a virtualized network function (VNF), a VM, a service chain, etc.), a container running a software resource (e.g., an application, an appliance, a VNF, a service chain, etc.), storage, a workload or workload engine, etc. Endpoints 522 can have an address (e.g., an identity), a location (e.g., host, network segment, VRF instance, domain, etc.), one or more attributes (e.g., name, type, version, patch level, OS name, OS type, etc.), a tag (e.g., security tag), a profile, etc.

Endpoints 522 can be associated with respective Logical Groups 518. Logical Groups 518 can be logical entities containing endpoints (physical and/or logical or virtual) grouped together according to one or more attributes, such as endpoint type (e.g., VM type, workload type, application type, etc.), one or more requirements (e.g., policy requirements, security requirements, QoS requirements, customer requirements, resource requirements, etc.), a resource name (e.g., VM name, application name, etc.), a profile, platform or operating system (OS) characteristics (e.g., OS type or name including guest and/or host OS, etc.), an associated network or tenant, one or more policies, a tag, etc. For example, a logical group can be an object representing a collection of endpoints grouped together. To illustrate, Logical Group 1 can contain client endpoints, Logical Group 2 can contain web server endpoints, Logical Group 3 can contain application server endpoints, Logical Group N can contain database server endpoints, etc. In some examples, Logical Groups 518 are EPGs in an ACI environment and/or other logical groups (e.g., SGs) in another SDN environment.

Traffic to and/or from Endpoints 522 can be classified, processed, managed, etc., based Logical Groups 518. For example, Logical Groups 518 can be used to classify traffic to or from Endpoints 522, apply policies to traffic to or from Endpoints 522, define relationships between Endpoints 522, define roles of Endpoints 522 (e.g., whether an endpoint consumes or provides a service, etc.), apply rules to traffic to or from Endpoints 522, apply filters or access control lists (ACLs) to traffic to or from Endpoints 522, define communication paths for traffic to or from Endpoints 522, enforce requirements associated with Endpoints 522, implement security and other configurations associated with Endpoints 522, etc.

In an ACI environment, Logical Groups 518 can be EPGs used to define contracts in the ACI. Contracts can include rules specifying what and how communications between EPGs take place. For example, a contract can define what provides a service, what consumes a service, and what policy objects are related to that consumption relationship. A contract can include a policy that defines the communication path and all related elements of a communication or relationship between EPs or EPGs. For example, a Web EPG can provide a service that a Client EPG consumes, and that consumption can be subject to a filter (ACL) and a service graph that includes one or more services, such as firewall inspection services and server load balancing.

As discussed previously, centralized policy enforcement models do not scale well, have low efficiencies, and affect the performance of endpoints. Because the more specific the policy is for the endpoint, the more difficult it is to scale with the centralized policy enforcement approach.

The present includes systems, methods, and computer-readable media for solving these problems/discrepancies by introducing a policy point structure with a co-located policy controller and policy enforcement engine close to the endpoints. Such a policy point is able to retrieve policies from different policy sources, and make a local policy decision specific for the endpoint it is serving, e.g. based on metadata from the endpoint and the retrieved policies.

Thus, the present technology provides numerous improvements over centralized policy enforcement models for endpoint specific policy enforcement. First, it provides better scalability. The present technology can make the policy decision with more local information such as the metadata, and make a real-time policy decision locally. Second, it also helps the local endpoints to have better performance. With the extra local information the current technology can take into consideration, it can provide better use of the local network for the local endpoint, and also help the endpoint to prioritize its resources. Third, it provide better policy decision for individual endpoint. Because the policy decisions are being made real-time and locally with local information.

Figure 6:
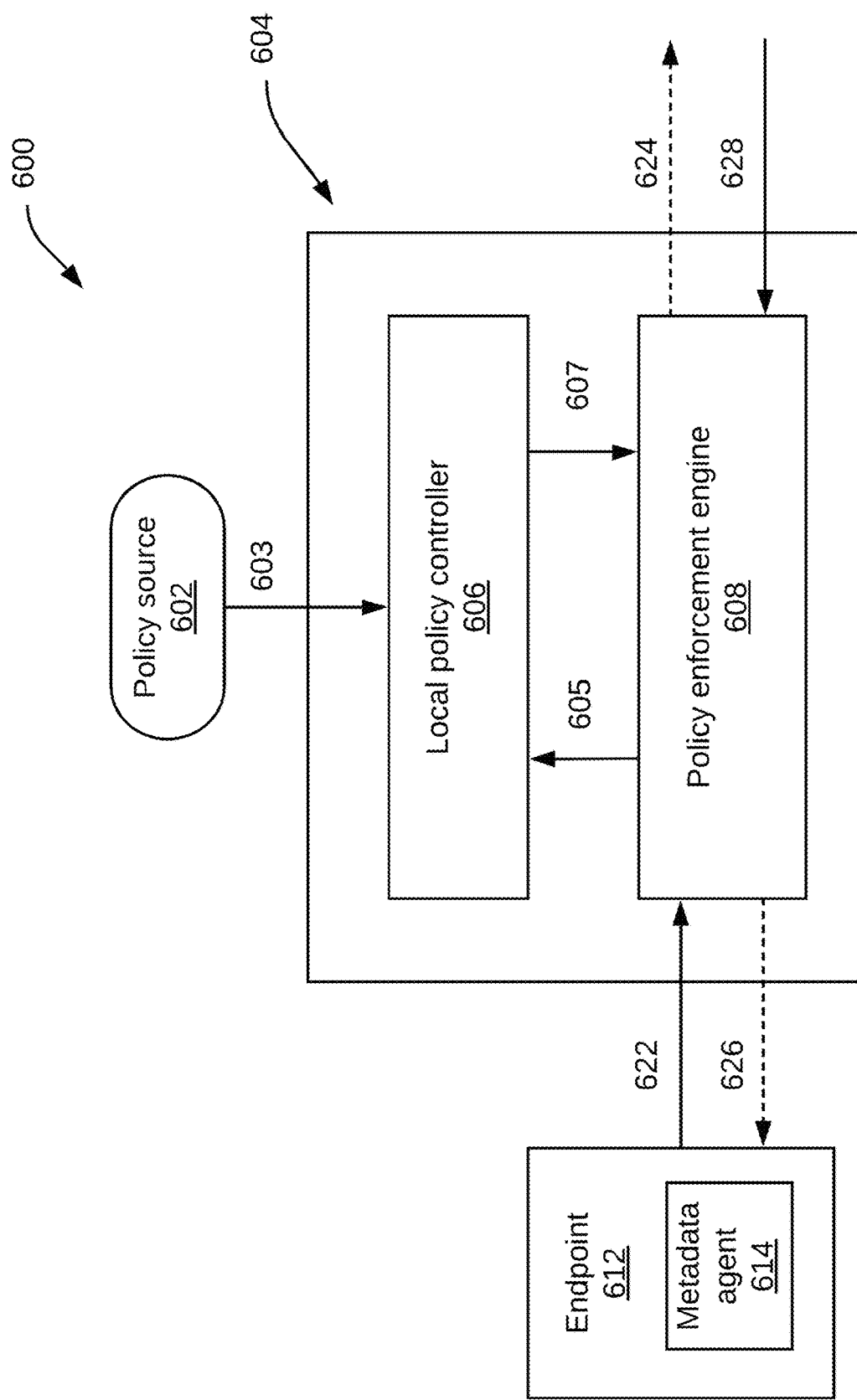
FIG. 6 shows an example environment for local on-path policy enforcement.

FIG. 6 shows an example environment 600 for local on-path policy enforcement. The environment 600 can be implemented as or otherwise as part of an applicable network environment, such as the example environments 500 shown in FIGS. 5A and 5B. In particular, the environment 600 can be implemented as an applicable SDN environment. Further, the environment 600 can be implemented according to an applicable network architecture, such as the architecture 100 or topology 200 shown in FIGS. 1 and 2.

The example environment 600 includes a policy source 602, a policy point 604, and an endpoint 612. The policy point 604 is located on the path for transferring data to and from the endpoint 612. The endpoint-aware policy point 604 is a point where the endpoint-specific policies for the traffic associated with endpoint 612 can be determined. In turn, the endpoint-specific policies can be locally enforced for the endpoint 612 at the endpoint-aware policy point, e.g. through control of data traffic traveling to and from the endpoint 612 through the point 604.

The policy point 604 includes a local policy controller 606 and a policy enforcement engine 608. The local policy controller 606 can subscribe to the policy source 602 to receive network-wide endpoint policies, e.g. via control plane 603. The policies can be endpoint-specific policies or general policies. For example, the network-wide endpoint policies can include a plurality of endpoint-specific policies that can be selectively applied to an endpoint, e.g. based on characteristics of the endpoint in accessing or providing access to network services. In another example, the network-wide endpoint policies can include general policies that can be modified to create endpoint-specific policies for an endpoint.

The policy point 604 can be implemented at a network device in the environment 600.

In some embodiments, the policy source 602 can include multiple policy sources. Such policy sources can include an applicable source of policy in a network environment, such as a Cisco® Digital Network Architecture Center (DNAC), Identity Services engine (ISE), vManage, Umbrella, Duo, etc. In some embodiments, a global policy aggregation entity can combine polices from multiple policy sources within the policy source 602, and deliver aggregated policies via the control plane 603 to the local policy controller 606. In some embodiments, the received policies from multiple policy sources can be directly aggregated at the local policy controller 606. In some embodiments, the endpoint-aware policy point 604 can selectively subscribe to policies that are applicable to endpoint 612 and/or selectively discard policies that are not applicable to the endpoint 612.

The endpoint 612 can transfer data packets to the rest of the network environment through data plane 622, the policy enforcement engine 608, and data plane 624, and receive data packets from the rest of the network environment through data plane 628, the policy enforcement engine 608, and data plane 626. The endpoint 612 further includes a metadata agent 614. The metadata agent 614 can extract or otherwise create relevant real-time policy metadata of the endpoint 612. In turn, the metadata agent 614 can tag traffic transmitted from the endpoint 612 with metadata for the endpoint 612. The metadata agent 614 can also receive request for policy metadata of the endpoint 612 from the policy enforcement engine 608. Some examples of such policy metadata agent 614 include AnyConnect, Duo, Mobile Device Management (MDM) agent, etc. The policy enforcement engine 608 can then determine the proper endpoint-specific polices for endpoint 612, and apply such endpoint-specific polices for both traffic from and to the endpoint 612.

As used herein the term "metadata," "policy metadata," or "metadata of an endpoint," shall be used to refer to any data related to the local operation and local policy enforcement of the endpoint in the network environment with respect to the data traffic both to and from that endpoint. Some examples of such metadata can include current location of the endpoint, the battery level of the endpoint, the radio access of the endpoint, application that is generating traffic at the endpoint, unusual change in data traffic volume, and the security status of the endpoint, etc. Such metadata can be either policy-specific metadata or policy-agnostic metadata. The policy-specific metadata is generated to apply one or more explicit policies for the endpoint. For example, the policy-specific metadata can include characteristics of the endpoint when an explicit application is running on the endpoint to enforce policies associated with the application. The policy-agnostic metadata can include metadata that is generated without respect to a specific policy. For example, the policy-agnostic metadata can include constantly tagging the traffic with the location of the endpoint.

One characteristic of this local policy decision making and enforcing technology utilizing the endpoint-aware policy point 604 is that the control of the endpoint policy metadata is maintained locally. This characteristic of the present technology provides two benefits. First, the format of the endpoint policy metadata can be controlled locally, e.g. through point 604. The format can be based on a multitude of existing encodings, and can even be an internal format between the endpoint 612 and the endpoint-aware policy point 604. Second, the privacy of the endpoint 612 can be better protected. This is because the environment 600 limits the endpoint policy metadata between the endpoint 612 and the endpoint-aware policy point 604, and the network operator can program the endpoint-aware policy point 604 to expose as much endpoint policy metadata to the rest of the network environment 600 as needed. In some embodiments, the endpoint-aware policy point 604 can choose to label the outgoing data packets via data plane 624 with a more generic tag, such as a Security Group Tag (SGT) that can be consumed by other network elements beyond the endpoint-aware policy point 604.

Although the local policy controller 606, and the policy enforcement engine 608 are described as separate entities included in the policy point 604, they are not limited to such a structure, some of their functions can be performed by the other interchangeably or by both of them.

Figure 7:
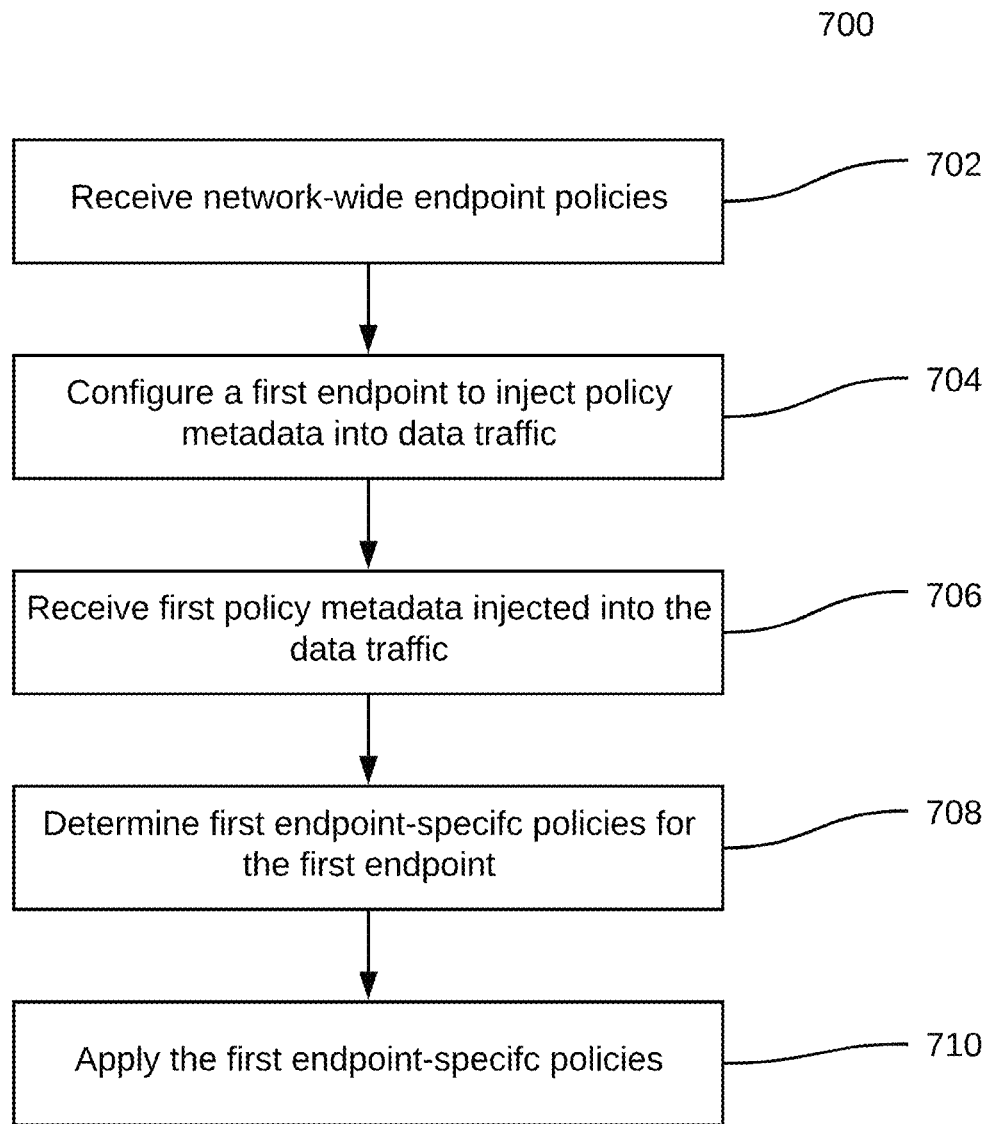
FIG. 7 illustrates an example method for local on-path policy enforcement.

FIG. 7 illustrates an example method 700 for local on-path policy enforcement. The method 700 shown in FIG. 7 is provided by way of example, as there are a variety of ways to carry out the method. Additionally, while the example method is illustrated with a particular order of steps, those of ordinary skill in the art will appreciate that FIG. 7 and the modules shown therein can be executed in any order and can include fewer or more modules than illustrated.

Each module shown in FIG. 7 represents one or more steps, processes, methods or routines in the method. For the sake of clarity and explanation purposes, the modules in FIG. 7 are described with reference to the environment 600 shown in FIG. 6.

A network device local to one or more endpoints in a network environment first receives one or more network-wide endpoint policies, from a centralized network controller (702). In some embodiments, the local network device can be policy point 604 or the policy enforcement engine 608. In some embodiments, the centralized network controller can be the local policy controller 606, and the local policy controller 606 receives the one or more network-wide endpoint polices from the policy source 602 via control plane 603. The one or more network-wide endpoint policies can be selected and provided based on the first endpoint or endpoints. In some embodiments, the one or more network-wide endpoint policies can be selected and provided from the local policy controller 606 to the policy enforcement engine 608 based on the endpoint 612.

In being local to the one or more endpoints, the network device can be on-path to the one or more endpoints. Specifically, the network device can be in one or more paths of data transmitted to and/or from the one or more endpoints. As a result, the network device can be utilized to enforce policy locally at the one or more endpoints, one example of enforcing such policy is by controlling traffic passing to and/or from the one or more endpoints.

A first endpoint of the one or more endpoints is configured to inject a first policy metadata into the data traffic (704). In some embodiments, the first endpoint can be the endpoint 612 including the metadata agent 614. In some embodiments, the metadata agent 614 of the endpoint 612 is configured to inject the first policy metadata by an external entity regarding which policy metadata to extract and how to encode it into data packets. Such example configuration can be done by the endpoint-aware policy point 604, by an external orchestration component, or by the network operator. In some embodiments, such data traffic might be the first flow of data transmitted from the endpoint 612.

The injected first policy metadata from the endpoint 612 is case specific and can vary depending on the scenario. In particular, a specific policy can be selected and applied to generate a specific type of metadata at the endpoint 612. In turn, the metadata can be used to apply the specific policy or other policies for the endpoint 612.

The network device receives the first policy metadata injected into the data traffic from the first endpoint (706). In some embodiments, the policy enforcement engine 608 can receive the first policy metadata injected into the data packets of the data traffic from the endpoint 612 via data plane 622. The policy enforcement engine 608 can share the received first policy metadata with the local policy controller 606 via data plane 605. In some embodiments, the policy sharing mechanism 605 can also be a control plane instead. In some embodiments, the first policy metadata includes data describing local operation of the endpoint 612 in the network environment with respect to the data traffic through data plane 622. In some embodiments, the first policy metadata includes policy-agnostic metadata for the endpoint 612. In some embodiments, the first policy metadata includes policy-specific metadata for the endpoint 612, and the policy-specific metadata is generated to apply one or more explicit policies for the endpoint 612.

The network device determines one or more first endpoint-specific policies for the first endpoint by evaluating the first policy metadata with respect to the one or more network-wide endpoint policies (708). In some embodiments, the endpoint-specific policies can be determined before evaluating the policy metadata. In some embodiments, the policy enforcement engine 608 determines such endpoint-specific policies for the endpoint 612, by evaluating the first policy metadata with respect to the one or more network-wide endpoint policies received by the local policy controller 606. The network device can generate endpoint-specific policies from the one or more network-wide endpoint policies before or during such determination process. In some embodiments, the endpoint-aware policy point 604 or the local policy controller 606 can refine and modify the one or more network-wide endpoint policies, or select all or portions of the one or more network-wide endpoint policies to generate the endpoint-specific policies for the endpoint 612, e.g. based on the first policy metadata.

The network device can determine the one or more first endpoint-specific policies for the first endpoint by evaluating both the first policy metadata and the past policy metadata with respect to the one or more network-wide endpoint policies. In some embodiments, the policy point 604 can continuously update and refine its knowledge of the endpoint 612 by keep receiving updated policy metadata from endpoint 612. Thus, the determination of the real-time endpoint-specific policies is based on both the latest and previous received metadata from the endpoint 612. In some embodiments, the policy point 604 can continuously receive updated network-wide endpoint policies from the policy source 602. Thus, the determination of the real-time endpoint-specific policies is also based on the updated network-wide endpoint policies.

The network device can determine the one or more first endpoint-specific policies for the first endpoint based on received policy updates. In some examples includes global policy changes that might affect the endpoint 612, the local policy controller 606 can receive policy updates to help the endpoint-aware policy point 604 to re-evaluate the latest policies it is enforcing, and determine new polices if necessary. Thus, the policy determination process can further include the following processes in the policy update scenario. First, the network device receives sequential policy updates to the one or more network-wide endpoint policies. Then, the network device aggregates the sequential policy updates to generate aggregated policy updates for the one or more network-wide endpoint policies. The network device is also able to modify the one or more first endpoint-specific policies based on aggregated policy updates to generate the one or more updated first endpoint-specific policies. Lastly, the network device can apply the one or more updated first endpoint-specific policies to further control the data traffic associated with the first endpoint based on the sequential policy updates to the one or more network-wide endpoint policies. In some embodiments, the network device can be one or a combination of the policy point 604, the local policy controller 606, and the policy enforcement engine 608.

The network device can also determine different network-specific policies for endpoints with different capabilities. In some embodiments, in order to determine endpoint capability based policies, the network device can initiate a capability negotiation with the first endpoint, or the metadata agent on the first endpoint before connection. In some embodiments, in order to determine capability based policies, the network device can propose policies and request the first endpoint to provide its response regarding its capability. Then, the first endpoint can reply either it has or does not have the capability for the proposed policies.

The network device applies the determined one or more first endpoint-specific policies (710). In some embodiments, the endpoint-specific policies include controlling data traffic associated with the first endpoint. The data traffic associated with the first endpoint can include either or both incoming data traffic to the first endpoint and outgoing data traffic from the first endpoint. In some embodiments, the endpoint-aware policy point 604 or the policy enforcement engine 608 applies the determined one or more first endpoint-specific policies to the data traffic from the endpoint 612 to the network environment via data plane 622. Then, the policy enforcement engine 608 can transmit the data traffic after application of the one or more first endpoint-specific policies to the intended parties in the network environment via data plane 624. In some embodiments, the endpoint-aware policy point 604 or the policy enforcement engine 608 applies the determined one or more first endpoint-specific policies to the data traffic from the network environment to the endpoint 612 via data plane 628. Then, the policy enforcement engine 608 can transmit the data traffic after application of the one or more first endpoint-specific policies to the endpoint 612 via data plane 626. Some example policies applied on the incoming data traffic includes dropping lower priority traffic to the endpoint, when the endpoint start to send out policy metadata indicating a low battery state. This example policy applied to the incoming data traffic can save power for the endpoint, so that the high priority data traffic, such as confidential information, can be transferred to the endpoint.

After applying the proper endpoint-specific policies to all the data traffic, the network operator can control, through the policy point 604, whether or not to expose the endpoint-specific policy metadata to the rest of the network environment, and if so how much of the endpoint-specific policy metadata to expose. In some embodiments, the network operator can control the policy point 604 to not expose any endpoint-specific policy metadata, thus the data traffic through data plane 624 will not include any endpoint-specific policy metadata. Specifically, the network device can be configured to remove policy metadata from the data traffic before it is transmitted to one or more intended recipients through the network environment.

Referring back to process 704, the required metadata from the first endpoint can change dynamically during operation to make real-time policy decisions. Thus, the applied endpoint-specific policies can change dynamically based on such real-time policy decisions. In some embodiments, general endpoint metadata is sufficient during regular operation of the environment 600. But due to a change of conditions of the endpoint 612, the policy point 604 can query the endpoint 612 for additional metadata before determining the proper endpoint-specific policies for the traffic associated with the endpoint 612. For some example policies that are based on the location of the endpoint 612, general endpoint metadata such as GPS coordinates of the location of the endpoint 612 is sufficient when the endpoint is stationary or within the same network environment. However, when the endpoint 612 is moving, the policy point 604 will request extra metadata related to the location of the endpoint 612, such as the new Wi-Fi name that the moving endpoint 612 can be connected to. Thus, the policy point 604 can triangulate the approximate location of the moving endpoint 612 and determine the proper endpoint-specific policies depending on the new location.

Having such a co-located local policy controller 606 and policy enforcement engine 608 to handle the policy update provides two benefits. First, the local policy controller 606 can always set a default local policies. The default local policies are the most appropriate polices during policy updates and/or temporary absence of endpoint metadata for the policy determination. Second, this will minimize the disruption of the performance of endpoint 612 when applying the policy updates. Because the co-located local policy controller 606 can aggregate sequential policy updates for the endpoint 612, then the policy enforcement engine 608 can apply the aggregated sequential policy updates as a combination.

Figure 8:
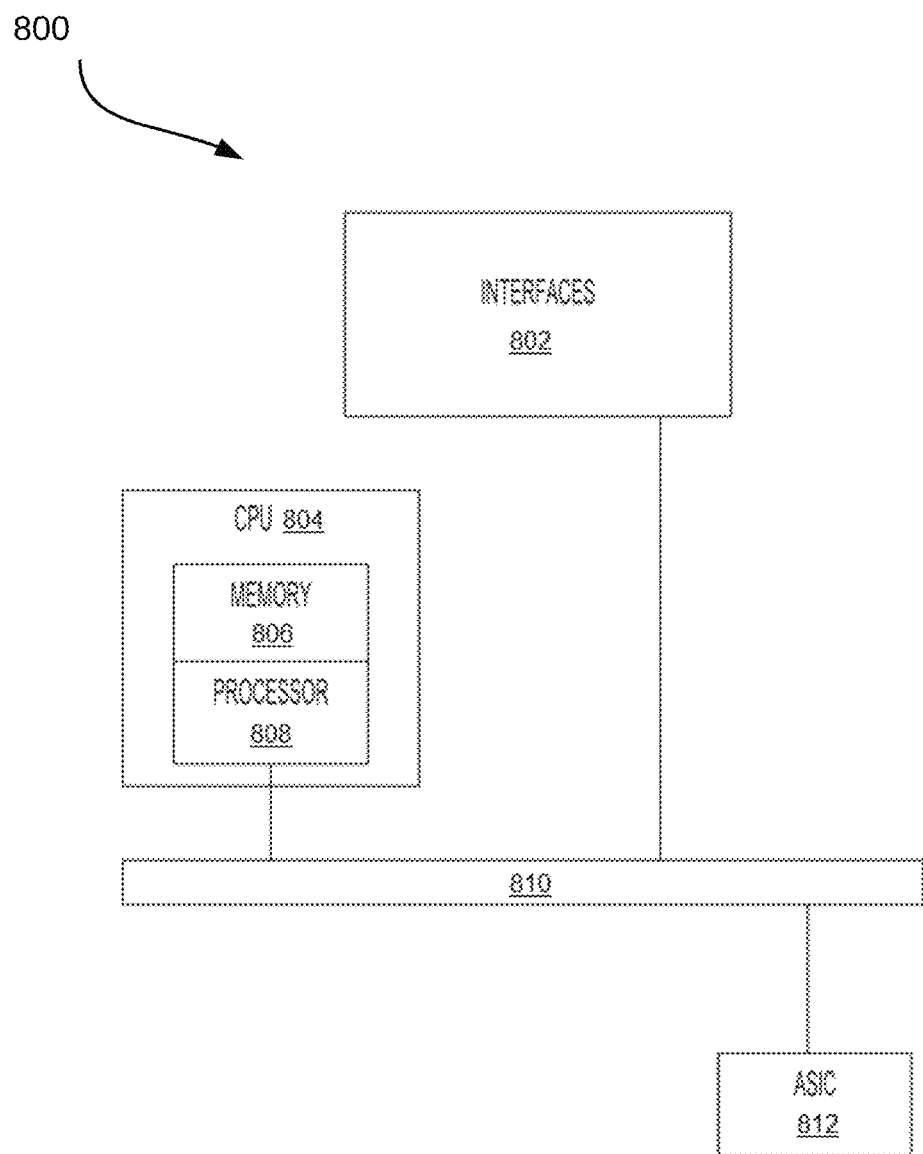
FIG. 8 illustrates an example of a network device.

FIG. 8 illustrates an example of a network device 800 (e.g., switch, router, network appliance, etc.). Such a network device 800 can be the policy point 604, the local policy controller 606, and the policy enforcement engine 608. The network device 800 can include a master central processing unit (CPU) 804, interfaces 802, and a bus 810 (e.g., a PCI bus). When acting under the control of appropriate software or firmware, the CPU 804 can be responsible for executing packet management, error detection, and/or routing functions. The CPU 804 preferably accomplishes all these functions under the control of software including an operating system and any appropriate applications software. The CPU 804 may include one or more processors 808 such as a processor from the Motorola family of microprocessors or the MIPS family of microprocessors. In an alternative embodiment, the processor 908 can be specially designed hardware for controlling the operations of the network device 800. In an embodiment, a memory 806 (such as non-volatile RAM and/or ROM) can also form part of the CPU 804. However, there are many different ways in which memory could be coupled to the system.

The interfaces 802 can be provided as interface cards (sometimes referred to as line cards). The interfaces 802 can control the sending and receiving of data packets over the network and sometimes support other peripherals used with the network device 800. Among the interfaces that may be provided are Ethernet interfaces, frame relay interfaces, cable interfaces, DSL interfaces, token ring interfaces, and the like. In addition, various very high-speed interfaces may be provided such as a fast token ring interface, wireless interface, Ethernet interface, Gigabit Ethernet interface, Asynchronous Transfer Mode (ATM) interface, High-Speed Serial Interface (HSSI), Packet Over SONET (POS) interface, Fiber Distributed Data Interface (FDDI), and the like. The interfaces 904 may include ports appropriate for communication with the appropriate media. In some cases, the interfaces 802 may also include an independent processor and, in some instances, volatile RAM. The independent processors may control communication intensive tasks such as packet switching, media control, and management. By providing separate processors for the communication intensive tasks, the interfaces 802 may allow the CPU 804 to efficiently perform routing computations, network diagnostics, security functions, and so forth.

Although the system shown in FIG. 8 is an example of a network device of an embodiment, it is by no means the only network device architecture on which the subject technology can be implemented. For example, an architecture having a single processor that can handle communications as well as routing computations and other network functions, can also be used. Further, other types of interfaces and media may also be used with the network device 900.

Regardless of the network device's configuration, it may employ one or more memories or memory modules (including the memory 806) configured to store program instructions for general-purpose network operations and mechanisms for roaming, route optimization, and routing functions described herein. The program instructions may control the operation of an operating system and/or one or more applications. The memory or memories may also be configured to store tables such as mobility binding, registration, and association tables.

Figure 9:
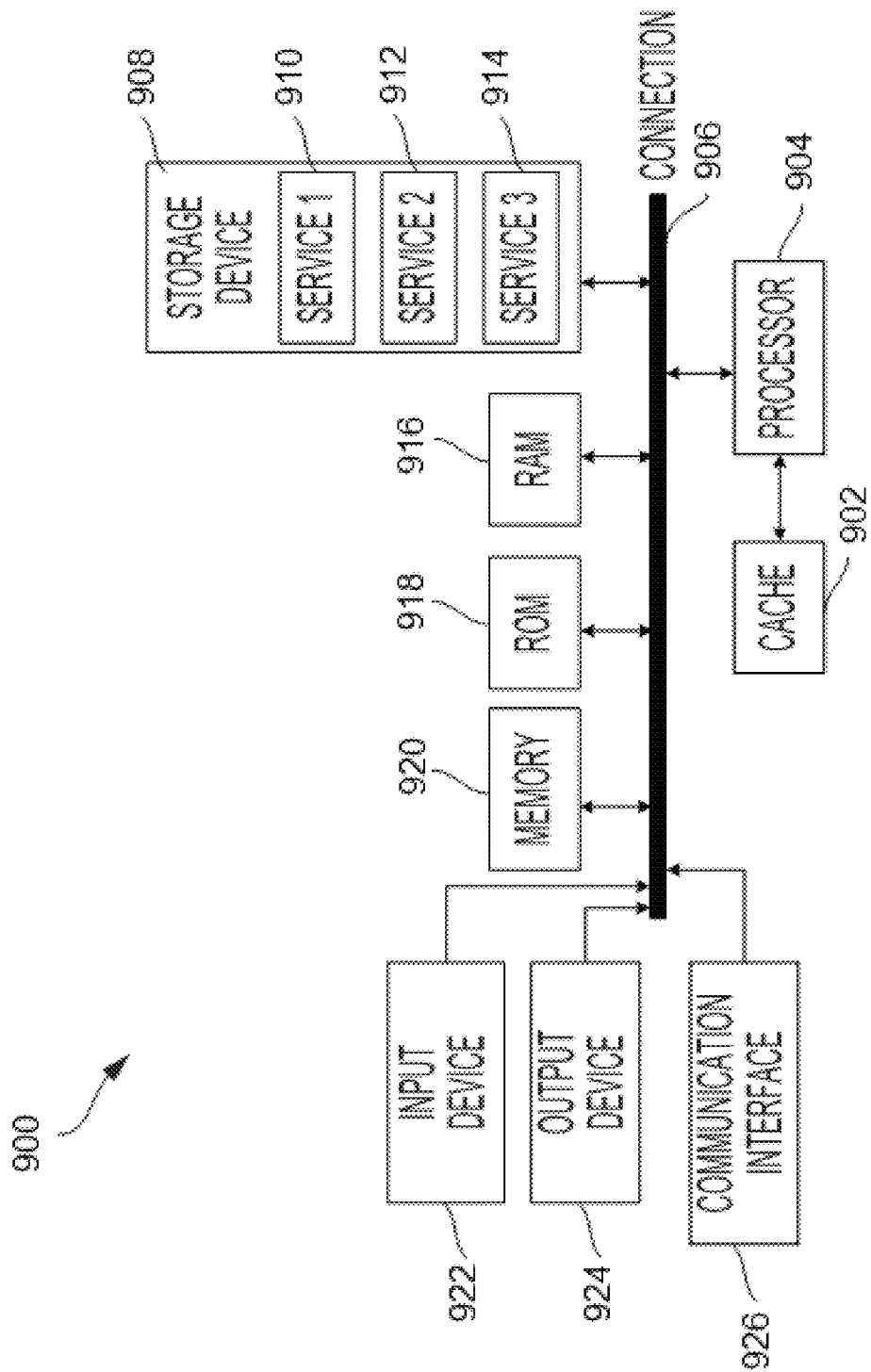
FIG. 9 illustrates an example of a computing system.

FIG. 9 illustrates an example of a bus computing system 900 wherein the components of the system are in electrical communication with each other using a bus 906. The computing system 900 can include a processing unit (CPU or processor) 904 and a system bus 906 that may couple various system components including the system memory 920, such as read only memory (ROM) 918 and random access memory (RAM) 916, to the processor 904. The computing system 900 can include a cache 902 of high-speed memory connected directly with, in close proximity to, or integrated as part of the processor 904. The computing system 900 can copy data from the memory 920, ROM 918, RAM 916, and/or storage device 908 to the cache 902 for quick access by the processor 904. In this way, the cache 902 can provide a performance boost that avoids processor delays while waiting for data. These and other modules can control the processor 904 to perform various actions. Other system memory 920 may be available for use as well. The memory 920 can include multiple different types of memory with different performance characteristics. The processor 904 can include any general purpose processor and a server, a hardware module or software module, such as module 910, module 912, and module 914 stored in the storage device 908, configured to control the processor 904 as well as a special-purpose processor where software instructions are incorporated into the actual processor design. The processor 904 may essentially be a completely self-contained computing system, containing multiple cores or processors, a bus, memory controller, cache, etc. A multi-core processor may be symmetric or asymmetric.

To enable user interaction with the computing system 900, an input device 922 can represent any number of input mechanisms, such as a microphone for speech, a touch-protected screen for gesture or graphical input, keyboard, mouse, motion input, speech and so forth. An output device 924 can also be one or more of a number of output mechanisms known to those of skill in the art. In some instances, multimodal systems can enable a user to provide multiple types of input to communicate with the computing system 900. The communications interface 926 can govern and manage the user input and system output. There may be no restriction on operating on any particular hardware arrangement and therefore the basic features here may easily be substituted for improved hardware or firmware arrangements as they are developed.

The storage device 908 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 908 can include the service or software modules 910, 912, 914 for controlling the processor 904. Other hardware or software modules are contemplated. The storage device 908 can be connected to the system bus 906. In some embodiments, a hardware module that performs a particular function can include a software component stored in a computer-readable medium in connection with the necessary hardware components, such as the processor 904, bus 906, output device 924, and so forth, to carry out the function.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, media, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
   receiving, by a network device local to a first endpoint in a network environment from a centralized network controller, a network-wide endpoint policy;
   receiving, by the network device from the first endpoint, first policy metadata injected into first data traffic, wherein the first policy metadata includes data specific to the first endpoint for locally applying policies to the first endpoint;

determining, by the network device, a first endpoint specific policy for the first endpoint by evaluating the first policy metadata with respect to the network-wide endpoint policy; and locally applying, by the network device, the first endpoint specific policy to control additional data traffic associated with the first endpoint.

2. The method of claim 1, wherein the network device is on-path in one or more traffic flows to or from the first endpoint and the network device receives the first policy metadata with the first data traffic through at least one of the one or more traffic flows.

3. The method of claim 1, wherein the first policy metadata includes the data describing local operation of the first endpoint in the network environment with respect to the first data traffic.

4. The method of claim 1, wherein the first policy metadata includes policy-specific metadata for the first endpoint, and the policy-specific metadata is generated to apply one or more explicit policies for the first endpoint.

5. The method of claim 1, further comprising:
identifying, by the network device, past policy metadata injected into past data traffic and received from the first endpoint; and
determining, by the network device, the first endpoint specific policy for the first endpoint by evaluating the first policy metadata and the past policy metadata with respect to the network-wide endpoint policy.

6. A system comprising:
one or more processors; and
a computer-readable medium comprising instructions stored therein, which when executed by the one or more processors, cause the one or more processors to perform operations comprising:
receive, by a network device local to a first endpoint in a network environment from a centralized network controller, a network-wide endpoint policy;
receive, by the network device from the first endpoint, first policy metadata injected into first data traffic, wherein the first policy metadata includes data specific to the first endpoint for locally applying policies to the first endpoint;
determine, by the network device, a first endpoint specific policy for the first endpoint by evaluating the first policy metadata with respect to the network-wide endpoint policy; and
locally apply, by the network device, the first endpoint specific policy to control additional data traffic associated with the first endpoint.

7. The system of claim 6, wherein the network device is on-path in one or more traffic flows to or from the first endpoint and the network device receives the first policy metadata with the first data traffic through at least one of the one or more traffic flows.

8. The system of claim 6, wherein the first policy metadata includes the data describing local operation of the first endpoint in the network environment with respect to the first data traffic.

9. The system of claim 6, wherein the first policy metadata includes policy-specific metadata for the first endpoint, and the policy-specific metadata is generated to apply one or more explicit policies for the first endpoint.

10. The system of claim 6, the operations further comprising:
identifying, by the network device, past policy metadata injected into past data traffic and received from the first endpoint; and
determining, by the network device, the first endpoint specific policy for the first endpoint by evaluating the first policy metadata and the past policy metadata with respect to the network-wide endpoint policy.

11. A non-transitory computer-readable storage medium comprising instructions stored therein, which when executed by one or more processors, cause the one or more processors to perform operations comprising:
receive, by a network device local to a first endpoint in a network environment from a centralized network controller, a network-wide endpoint policy;
receive, by the network device from the first endpoint, first policy metadata injected into first data traffic, wherein the first policy metadata includes data specific to the first endpoint for locally applying policies to the first endpoint;
determine, by the network device, a first endpoint specific policy for the first endpoint by evaluating the first policy metadata with respect to the network-wide endpoint policy; and
locally apply, by the network device, the first endpoint specific policy to control additional data traffic associated with the first endpoint.

12. The non-transitory computer-readable storage medium of claim 11, wherein the network device is on-path in one or more traffic flows to or from the first endpoint and the network device receives the first policy metadata with the first data traffic through at least one of the one or more traffic flows.

13. The non-transitory computer-readable storage medium of claim 11, wherein the first policy metadata includes the data describing local operation of the first endpoint in the network environment with respect to the first data traffic.

14. The non-transitory computer-readable storage medium of claim 11, wherein the first policy metadata includes policy-specific metadata for the first endpoint, and the policy-specific metadata is generated to apply one or more explicit policies for the first endpoint.

15. The method of claim 1, further comprising:
determining whether to expose the first policy metadata to the network environment; and
removing from the first data traffic, in response to determining not to expose the first policy metadata to the network environment, the first policy metadata before transmission to one or more intended recipients.

16. The method of claim 15, further comprising:
determining how much of the first policy metadata to expose to the network environment; and
removing from the first data traffic, in response to the determining how much, a portion of the first policy metadata before transmission to one or more intended recipients.

17. The system of claim 6, further comprising:
determine whether to expose the first policy metadata to the network environment; and
remove from the first data traffic, in response to determining not to expose the first policy metadata to the network environment, the first policy metadata before transmission to one or more intended recipients.

18. The system of claim 6, further comprising:
determining how much of the first policy metadata to expose to the network environment; and
removing from the first data traffic, in response to the determining how much, a portion of the first policy metadata before transmission to one or more intended recipients.

19. The non-transitory computer-readable storage medium of claim 11, further comprising:
- determine whether to expose the first policy metadata to the network environment; and
- remove from the first data traffic, in response to determining not to expose the first policy metadata to the network environment, the first policy metadata before transmission to one or more intended recipients.

20. The non-transitory computer-readable storage medium of claim 11, further comprising:
- determine how much of the first policy metadata to expose to the network environment; and
- remove from the first data traffic, in response to the determining how much, a portion of the first policy metadata before transmission to one or more intended recipients.

\* \* \* \* \*